United States Patent
Hansson

(10) Patent No.: US 8,400,788 B2
(45) Date of Patent: Mar. 19, 2013

(54) POWER SUPPLY APPARATUS FOR A CAPACITIVE LOAD

(75) Inventor: Mikael Hansson, Trelleborg (SE)

(73) Assignee: Primozone Production AB, Löddeköpinge (SE)

( * ) Notice: Subject to any disclaimer, the term of this patent is extended or adjusted under 35 U.S.C. 154(b) by 712 days.

(21) Appl. No.: 12/520,495

(22) PCT Filed: Dec. 17, 2007

(86) PCT No.: PCT/EP2007/064053
§ 371 (c)(1),
(2), (4) Date: Dec. 2, 2009

(87) PCT Pub. No.: WO2008/074767
PCT Pub. Date: Jun. 26, 2008

(65) Prior Publication Data
US 2010/0101936 A1  Apr. 29, 2010

Related U.S. Application Data

(60) Provisional application No. 60/876,050, filed on Dec. 20, 2006.

(51) Int. Cl.
*H02M 3/335* (2006.01)
(52) U.S. Cl. .................. 363/21.03; 363/21.02
(58) Field of Classification Search .......... 363/20, 363/21.02, 21.03, 21.08, 24, 25, 97, 21.01; 323/268, 271
See application file for complete search history.

(56) References Cited

U.S. PATENT DOCUMENTS

| | | |
|---|---|---|
| 3,752,748 A | 8/1973 | McMillan, Jr. |
| 3,883,413 A | 5/1975 | Douglas-Hamilton |
| 4,063,108 A | 12/1977 | Klett et al. |
| 4,314,344 A | 2/1982 | Johns et al. |
| 4,857,277 A | 8/1989 | Broomfield |
| 4,940,921 A | 7/1990 | Helling et al. |
| 5,135,725 A | 8/1992 | Hendrickson et al. |
| 5,155,676 A | 10/1992 | Spreen |
| 5,166,869 A | 11/1992 | Hesterman |
| 5,291,383 A * | 3/1994 | Oughton .................. 363/17 |
| 5,319,342 A | 6/1994 | Kuroki |
| 5,363,020 A | 11/1994 | Chen et al. |
| 5,403,441 A | 4/1995 | McDonald |
| 5,474,750 A | 12/1995 | Racca et al. |
| 5,501,844 A | 3/1996 | Kasting, Jr. et al. |

(Continued)

FOREIGN PATENT DOCUMENTS
CN   85 1 00091 A   8/1986
DE   40 22 243 A1   1/1992

(Continued)

OTHER PUBLICATIONS

International Search Report for PCT/EP2007/064053 dated Oct. 23, 2008.

*Primary Examiner* — Matthew Nguyen
(74) *Attorney, Agent, or Firm* — Knobbe Martens Olson & Bear LLP

(57) ABSTRACT

The invention provides a power supply apparatus for supplying electric power to a capacitive load. The apparatus has a transformer, a positive half-period driver and a negative half-period driver supplying positive and negative half-periods of voltage to the first coil. The second coil forms an electric resonance circuit and supplies electric voltage to the load. Zero crossings of the voltage supplied to the first coil are determined from a third coil on the transformer, and alternation between positive and negative half-periods of voltage supplied to the first coil is done at the zero crossings of the voltage supplied to the first coil.

6 Claims, 2 Drawing Sheets

U.S. PATENT DOCUMENTS

| | | |
|---|---|---|
| 5,573,730 A | 11/1996 | Gillum |
| 6,019,949 A | 2/2000 | Dunder |
| 6,181,076 B1 | 1/2001 | Trestman et al. |
| 6,451,267 B1 | 9/2002 | Ayad et al. |
| 6,504,270 B1 * | 1/2003 | Matsushita .................. 307/140 |
| 6,987,372 B1 | 1/2006 | Wu et al. |
| 2002/0167388 A1 | 11/2002 | Usui |
| 2004/0160794 A1 | 8/2004 | Lin |
| 2011/0199793 A1 * | 8/2011 | Kuang et al. ................ 363/21.13 |

FOREIGN PATENT DOCUMENTS

| | | |
|---|---|---|
| DE | 101 54 776 A1 | 5/2002 |
| EP | 0 538 102 A1 | 4/1993 |
| GB | 2 250 383 A | 6/1992 |
| JP | 55-23032 | 2/1980 |
| JP | 60000718 A2 | 1/1985 |
| JP | 2003-146624 A | 5/2003 |
| WO | WO 93/08636 A1 | 4/1993 |
| WO | WO 00/78670 A1 | 12/2000 |
| WO | WO 2004/021375 A1 | 3/2004 |
| WO | WO 2004/036605 A1 | 4/2004 |
| WO | WO 2004/105226 A1 | 12/2004 |
| WO | WO 2006/043248 A1 | 4/2006 |

* cited by examiner

POWER SUPPLY APPARATUS FOR A CAPACITIVE LOAD

CROSS REFERENCE TO RELATED APPLICATION

This application claims the benefit and priority to and is a U.S. National Phase of PCT International Application Number PCT/EP2007/064053, filed on Dec. 17, 2007, designating the United States of America and published in the English language, which is an International Application of and claims the benefit of priority to U.S. Provisional Application No. 60/876,050, filed on Dec. 20, 2006. The disclosures of the above-referenced applications are hereby expressly incorporated by reference in their entireties

FIELD OF THE INVENTION

The present invention relates to power supply apparatuses for supplying electric power to a capacitive load. The invention also relates to a method for operating such power supply apparatuses having a capacitive load such as an ozone generating device coupled to the power supply apparatus. Furthermore the invention relates to a high voltage transformer suitable for use in such power supply apparatuses.

BACKGROUND OF THE INVENTION

An example of capacitive loads is an ozone generating device coupled to a power supply apparatus generating an AC voltage to be supplied to the ozone generating device. Such power supply apparatuses have an inductive output impedance, and when the ozone generating device is connected to the output of the power supply apparatus, the inductive output impedance of the power supply apparatus and the capacitive impedance of the ozone generating device form a resonance circuit having a resonance frequency. Such ozone generating devices are driven at frequencies and voltages that are sufficiently high to produce a corona discharge in the ozone generating device. Air containing oxygen ($O_2$) such as atmospheric air or pure oxygen is supplied to the ozone generating device, the corona converts oxygen molecules ($O_2$) in the ozone generating device to ozone ($O_3$), and air with an enhanced content of ozone in comparison to the air supplied to the ozone generating device is supplied from the ozone generating device. The amount of ozone produced by the ozone generating device increases with the voltage supplied to it, and for minimizing losses in the supply apparatus driving the ozone generating device the power supply apparatus should be operated at or near the resonance frequency. In practice, however, for several reasons the resonance frequency may not be constant and may vary over time and as a function of operating parameters including temperature and pressure in the supplied air/oxygen; exchanging the ozone generating device or parts thereof, e.g. for service or maintenance, may change the resonance frequency due to differences or tolerances in capacitance; and the resonance frequency may also change with the voltage at which the ozone generating device is operated since the corona is a non-linear phenomenon. It would therefore be advantageous to have a power supply apparatus which operates at the actual resonance frequency of the resonance circuit and which adapts its frequency of operation to the actual resonance frequency of the resonance circuit.

Ozone generating devices may be operated at voltage levels in the range of several kV, at frequencies of several kHz and at power levels of several kW. The power supply apparatus may have a high voltage transformer with a high voltage second coil as its output. When designing high voltage and high frequency transformers special considerations should be paid to the design of in particular the high voltage coil to avoid arcing between windings of the high voltage coil and between the windings and other objects near the coils. Arcing itself may damage the high voltage coil and other components, but arcing will create ozone which may have undesired effects on the equipment and the environment. It would therefore be advantageous to have a high voltage transformer with a high voltage coil where arcing between windings of the high voltage coil is reduced or even avoided.

On a commercial and industrial scale ozone is produced from oxygen, $O_2$, in a gas containing oxygen. The oxygen-containing gas can be atmospheric air or oxygen-enriched gas. Methods exist for extracting oxygen from atmospheric air to produce oxygen-enriched gas. Ozone can be produced from oxygen mainly by two methods, one comprising irradiating the oxygen with ultra violet light, the other comprising a corona discharge device. Providing oxygen-enriched gas and producing ozone from oxygen are processes that consume energy and the consumptions of energy and other resources of the two processes are comparable.

In some applications where ozone is used a predetermined yield of ozone is needed or prescribed, or the required yield of ozone may change. A simple and straightforward way of adjusting the yield is to adjust only the electric power of the ozone-generating apparatus and leaving the flow or supply of oxygen-containing gas constant, or vice versa. This is not optimised for minimising the consumption of resources comprising oxygen-containing gas and power supplied from the power supply apparatus, and the desired yield may possibly not result or may even be impossible to obtain.

OBJECT OF THE INVENTION

It is an object of the invention to provide a power supply apparatus having an inductive output impedance for supplying electric power to a capacitive load where it is ensured that the resonance circuit formed by the inductive output impedance and the capacitive load impedance is operated at the resonance frequency and.

It is also an object of the invention to provide a method of operating an ozone generating apparatus in order to minimise the consumption of resources comprising oxygen-containing gas and power supplied from the power supply apparatus.

It is a further object of the present invention to provide a high voltage transformer with reduced risk of arcing between windings of the high voltage coil and which is suitable for handling voltages in the kV range, frequencies in the kHz range and power levels in the kW range.

SUMMARY OF THE INVENTION

The invention provides a power supply apparatus for supplying electric power to a capacitive load having a capacitive load impedance. The apparatus comprises
  a transformer with a first coil and a second coil,
  a positive half-period driver and a negative half-period driver arranged to alternatingly supply positive half-periods of voltage and negative half-periods of voltage, respectively, to the first coil,
the second coil is connectable to the capacitive load so as to form an electric resonance circuit having a resonance frequency, and to supply electric voltage to the load, and
  a device for determining zero crossings of the voltage supplied to the first coil and for causing alternation between positive and negative half-periods of voltage supplied to the first coil at the zero crossings of the voltage supplied to the first coil, wherein the device for determining zero crossings comprises a third coil on the transformer.

An effect of this is that alternation between positive and negative half-periods of voltage supplied to the first coil is controlled by the actual resonance frequency of the resonance circuit formed by the second coil of the transformer and the capacitive load.

Another effect is that electric switching noise from the switching elements is avoided since switching is done at times with no or very low voltage across the switching elements.

Such a power supply apparatus is useful for supplying electric power to a capacitive load having a capacitive load impedance such as an ozone generating device, and in particular an ozone generating device in which a suitable combination of frequencies and voltages that are sufficiently high to produce a corona discharge in the ozone generating device.

Other examples of capacitive loads include, without limiting the invention thereto:
  reactors for the destruction or disintegration of substances or gases. Examples of gases that are considered to have a negative effect on the environment if released are Halon 1301 and other gases having fire extinguishing properties, $SF_6$ and other gases used e.g. for their electrical properties, and gases used in cooling apparatuses;
  piezo-electric transducers used e.g. for generating ultrasound in a medium for cleaning of objects immersed into the medium;
  electro-luminescent devices such as electro-luminescent films for use in LCD screens and in signs; and
  devices for producing light arcs or corona discharges. Such devices are used e.g. for producing ozone from an oxygen-containing gas.

The device for determining zero crossings may sense the voltage itself, but in high voltage applications this may not be feasible, and the device may then comprise a separate coil on the transformer. This ensures that the sensed voltage is in phase with the voltages in the coils, whereby it is ensured that alternating between positive and negative half-periods of voltage supplied to the first coil is actually done at the zero crossings of the voltage supplied to the first coil.

In an embodiment each of the positive and negative half-period drivers is arranged to feed a voltage through an inductive element to the first coil for a duration of no more than one quarter of a period corresponding to a predetermined highest resonance frequency. The inductive element reduces high frequency content of the voltage supplied to the first coil whereby electromagnetic interference is also reduced.

In an embodiment the duration of the voltage fed through the inductive element is controllable to durations between zero and one quarter of a period corresponding to the predetermined highest resonance frequency. This is useful for controlling and varying the power supplied to the capacitive load. This maximum duration is the first half of a half-period, where voltage builds up, and the second half of the half-period is then used for the voltage to decrease.

In an embodiment the resonance frequency is higher than the audible frequency range for humans. This ensures that sound caused by alternating between positive and negative half-periods of voltage supplied to the first coil is inaudible.

In an embodiment the positive and negative half-period drivers each comprises an electronic switching element such as a solid state semiconductor switch or a vacuum tube.

In an embodiment where an ozone generating device is connected to the second coil of the power supply apparatus to form an ozone-generating apparatus, the apparatus can be operated according to a method comprising controlling the power supplied from the power supply apparatus to the ozone generating device to a predetermined power level; supplying a flow of oxygen-containing gas to the ozone generating device; and controlling the flow of oxygen-containing gas so as to obtain a predetermined concentration of ozone from the ozone generating device.

In an embodiment the power supply apparatus includes a transformer comprising a core, a low voltage coil on the core, and a high voltage coil on the core, where the high voltage coil has a plurality of insulating carrier substrates stacked in an overlaying arrangement, each carrier substrate carrying an electrically conductive trace with end portions, the trace forming one or more turns around the core, and a connector pad connecting an end portion of the trace on one substrate to an end portion of a trace on an overlaying substrate.

Traditional transformers have two or more layers with several turns in each layer where an outer layer is wound around an inner layer, and physically adjacent turns in adjacent layers can be separated electrically by several turns. This requires very good insulation between layers in order to avoid arcing between layers. A high voltage transformer according to the invention has the advantage that the maximum voltage between physically adjacent turns of the high voltage coil is limited to the voltage difference between two electrically adjacent turns. This minimizes the risk of arcing between turns, whereby a long lifetime of the coil can be expected. Further, the high voltage coil of such a transformer can have a short length measured along the core, whereby it can be made compact, and it can be manufactured with a high degree of precision compared to coils that are wound from a length of wire. The coil can be manufactured as one unit, and if needed the entire coil can easily be exchanged, and individual substrates carrying one or more turns can also be exchanged. Coils can be composed of as many substrates as needed according to the actual application.

BRIEF DESCRIPTION OF THE FIGURES

The invention will now be described in more detail with regard to the accompanying figures. The figures show one way of implementing the present invention and are not to be construed as being limiting to other possible embodiments falling within the scope of the attached claim set.

DETAILED DESCRIPTION OF AN EMBODIMENT

Figure 1:
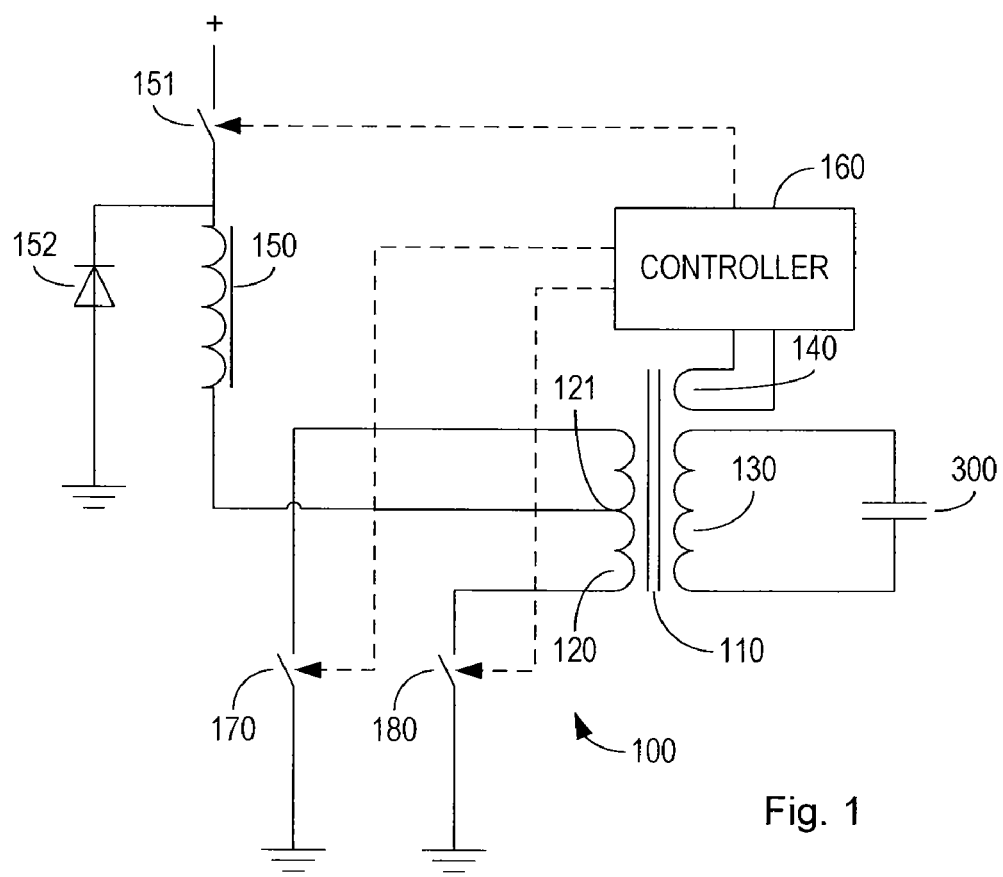
FIG. 1 shows schematically a first embodiment of a power supply apparatus of the invention.

In FIG. 1 is shown a power supply apparatus 100 with a load 300 having a load impedance with a capacitive component C and possibly also a resistive component. The load 300 is therefore referred to as a capacitive load and is illustrated as a capacitor. The load 300 can be any capacitive load such as an ozone generating device. The power supply apparatus 100 comprises a transformer 110 with a first coil 120 and a second coil 130. The first coil 120 has a centre tap 121, which is connected to an inductive coil 150 and a switching element 151. The switching element 151 can be operated under the control of a controller 160 to open and close and thereby establish and disestablish a connection between the inductive coil 150 and a DC supply voltage. Switching elements 170 and 180 at respective ends of the first coil 120 are also operated under the control of the controller 160 to establish and disestablish connections to ground. The switching elements 151, 170 and 180 are preferably solid state semiconductor switching elements such as CMOS transistors, SCR's or other fast switching elements. In some applications it might be considered to use vacuum tube switching elements. The second coil 130 of the transformer 110 has an impedance with an inductive component L and possibly also a resistive component R. Thereby the complex impedance Z is of the form $Z=R+j\omega L$. The capacitive load 300 is detachably connected to the second coil 130 of the transformer 110 to form a resonance circuit with a resonance frequency $f_r$ determined by the capacitive component C of the capacitive load and the inductive component L of the second coil 130 of the transformer 110 in accordance with the formula $f_r = 1/2\pi\sqrt{LC}$. The transformer 110 also has a third coil 140 connected to the controller 160.

Figure 2:
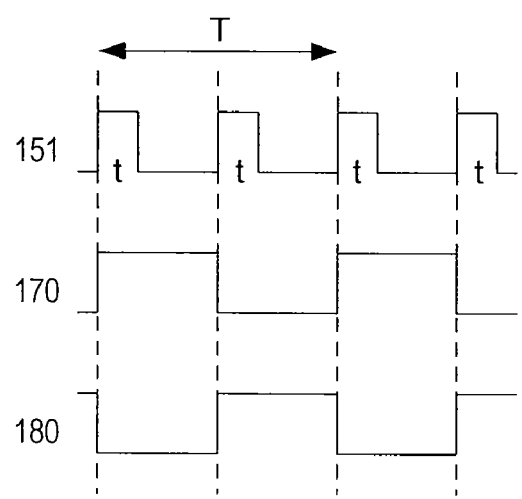
FIG. 2 illustrates the timing of the first and second half-period drivers in the embodiment in FIG. 1.

In FIG. 2 is illustrated the operation of the power supply apparatus 100 in FIG. 1. The resonance circuit formed by the capacitive load 300 connected to the second coil 130 of the transformer 110 has a resonance frequency with a corresponding period T. In a first half-period the controller 160 controls the switching element 151 and the switching element 170 to close, whereby electric current flows from the DC voltage source through the inductive coil 150 and through the centre tap 121 into the upper half of the first coil 120 and through the switching element 170 to ground. The inductive coil 150 and the inductive impedance of the first coil 120 of the transformer 110 have the effect that this current does not rise momentarily but exponentially towards an upper asymptote. After a period t the switching element 151 is controlled to open, and due to the inductive impedance in the circuit including the inductive coil 150 the current in the upper half of the first winding 120 continues but is now drawn through the diode 152 rather than from the DC voltage source. The voltage over the switching element 180 decreases at a rate determined by the resonance frequency. After one half-cycle T/2 of the resonance frequency this voltage has decreased to zero the switching elements 170 and 180 are both controlled to change their state so that switching element 170 is opened and switching element 180 is closed, and the next half-cycle begins. Electric current flows from the DC voltage source through the inductive coil 150 and through the centre tap 121 into the lower half of the first winding 120 and through the switching element 180 to ground. After another period t the switching element 151 is controlled to open, and the current in the lower half of the first winding 120 continues but is now again drawn through the diode 152 rather than from the DC voltage source. The voltage over the switching element 170 decreases at a rate determined by the resonance frequency. After another half-cycle, i.e. one full cycle, of the resonance frequency this process is repeated.

The actual resonance frequency determines the time when the voltage over the open one of the switching elements 170 and 180 is zero, which happens after each half-period, which is when the switching of switching elements 151, 170 and 180 is made. This time is determined using the third coil 140 on the transformer. The coil 140 senses a voltage which is in phase with the voltage over the open one of the switching elements 170 and 180, which in particular means that zero crossings occur simultaneously. The voltages sensed by the third coil 140 is input to the controller 160, and the controller 160 determines zero crossings of the voltage sensed by the third coil 140, at which times the switching elements are controlled as described above.

The period t in which the switching element 151 is closed can be varied, and the switching element 151 may be controlled to open e.g. when the current has reached a predetermined level. Hereby e.g. the average value or the RMS value of the voltage on the first and second coils can be controlled, and hereby the power delivered to the load can be varied. The maximum duration of the period t in which the switching element 151 is closed is determined as no more than one quarter of a period T corresponding to a predetermined highest resonance frequency at which the apparatus is designed to operate.

In case of disconnection of the capacitive load during operation of the apparatus the resonance frequency will increase, which might cause undesired operating conditions, in particular if the switch 151 were allowed to operate at such increased resonance frequencies. In order to avoid such conditions a maximum repetition frequency has been set for the operation of the switch 151. This maximum repetition frequency corresponds to the predetermined highest resonance frequency at which the apparatus is designed to operate or slightly higher.

In case of short circuiting of the terminals of the second coil 130 during operation of the apparatus undesired operating conditions might also arise, in particular high currents in the first and second coils of the transformer. The opening of the switching element 151 when the current has risen to a predetermined level limits the current that can be drawn from the second coil, which is useful in case of short circuiting of the terminals of the second coil 130.

Figure 3:
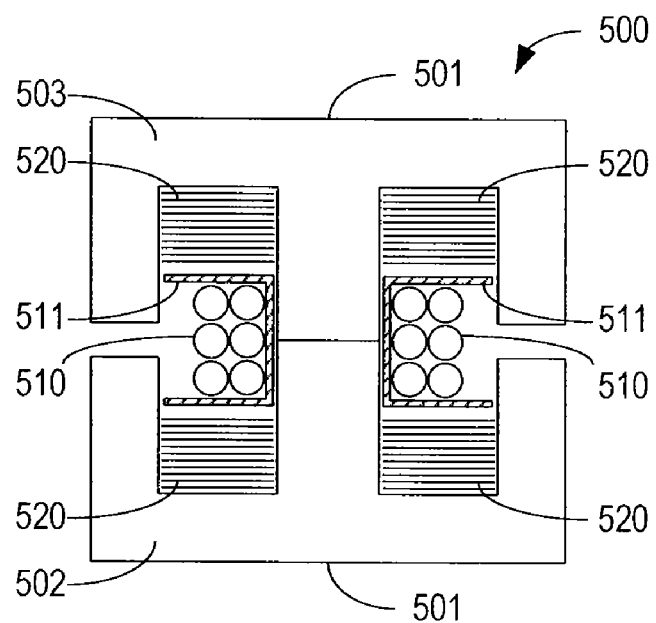
FIG. 3 is a cross section through a high voltage transformer used in the embodiment in FIG. 1, and FIGS. 4 and 5 each shows a substrate carrying an electrically conductive trace for use in the transformer in FIG. 3.

FIG. 3 shows an embodiment of a high voltage transformer 500 suitable for use in the embodiment in FIG. 1. The transformer 500 has a core 501 composed of two preferably identical E cores 502 and 503 with their middle legs touching each other and thus in magnetic contact with each other. Their outer legs are shorter than the middle legs whereby air gaps are formed in each of the outer legs of the core. A first coil 510 is wound on a bobbin 511 and placed around the middle leg. A second, high voltage coil 520 comprising two half-coils with one half-coil placed on either side of the first coil 510.

Figure 4:
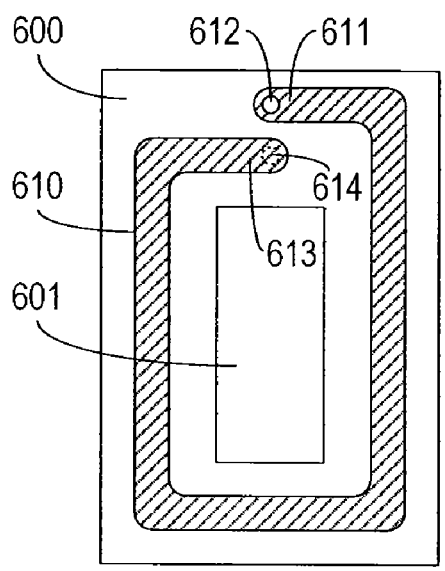

FIG. 4 shows an embodiment of the individual turns of the high voltage transformer in FIG. 3. A flat sheet or substrate 600 of an electrically insulating material with a central opening 601 carries an electrically conductive trace 610 forming a loop around the central opening 601. At the outer end portion 611 the electrically conductive trace 610 has a connector pad 612 on the same side of the substrate 600 as the conductive trace 610, and at the inner end portion 613 the electrically conductive trace 610 has a connector pad 614 on the opposite side of the substrate 600 with a through-going connection. The conductive trace 610 can have one or more turns around the central opening 601.

Figure 5:
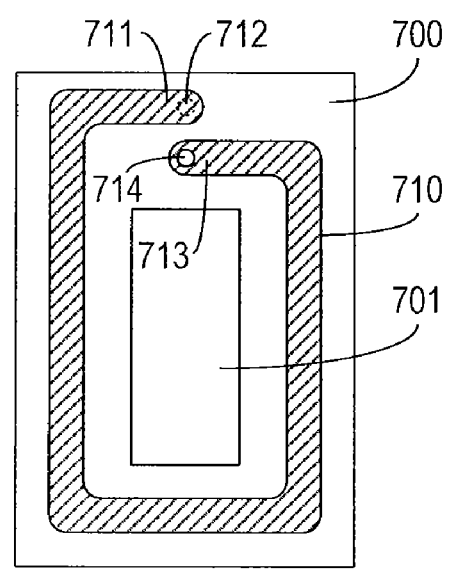

FIG. 5 shows another embodiment of the individual turns of the high voltage transformer in FIG. 3. A flat sheet or substrate 700 of an electrically insulating material with a central opening 701 carries an electrically conductive trace 710 forming a loop around the central opening 701. The structure in FIG. 7 is a mirror image of the structure in FIG. 6, except that at the outer end portion 711 the electrically conductive trace 710 has a connector pad 712 on the opposite side of the substrate 700 with a through-going connection, and at the inner end portion 713 the electrically conductive trace 710 has a connector pad 714 on the same side of the substrate 700 as the conductive trace 710. The conductive trace 710 can have one or more turns around the central opening 701.

In FIG. 3 each of the half-coils of the high voltage coil 520 is composed by stacking alternating substrates 600 and 700. When a substrate 600 is placed on top of a first substrate 700 in an overlaying arrangement, the pad 614 will be just above the pad 714, and the two pads 614 and 714 can be connected electrically, e.g. by soldering. The thus interconnected traces 610 and 710 on their respective substrates will thereby form two turns or loops around the central openings. A second substrate 700 can then be placed on top of the substrate 600 with the pad 712 just above the pad 612, and the two pads 612 and 712 can be connected electrically in the same manner to form a coil with three turns. In this way several substrates 600 and 700 can be stacked alternatingly to form a coil with any desired number of turns. The high voltage coil 520 of the transformer 500 comprises two half-coils which each are made like this. In FIG. 3 the high voltage coil 520 with its thus stacked substrates is seen from the edge of the substrates.

The distance from the electrically conductive traces 610 and 710 to the edge of the substrate should be large enough to prevent arcing between traces on adjacent substrates.

As mentioned, in an embodiment the ozone generating apparatus described above will be operated at frequencies above the audible range for humans, e.g. in the frequency range 15-25 kHz. This also has the effect that the size of the transformer core can be reduced in comparison to the size required at lower frequencies.

For high frequency purposes Litz wire is used for the first coil 510. Litz wire consists of a number of insulated wire strands which may be twisted or woven together. At high frequencies the electric current will flow in a surface layer of a thickness which decreases with increasing frequency—this is the so-called skin effect. At 20 kHz the skin depth is about 0.5 mm in copper. At the air gaps in the outer legs of the transformer the stray magnetic field may influence the first coil 510. The use of Litz wire reduces the eddy currents in the first coil 510.

For high frequency purposes a laminated transformer core or a ferrite core can be used to reduce or eliminate eddy currents in the core.

The core 502, 503 has air gaps in the outer legs. Such a transformer is particularly useful for to supply loads that exhibit negative resistance, such as corona discharge devices used for ozone production in an apparatus of the invention. At the air gaps there will be a magnetic stray field, and there is a distance from the first coil 510 to the air gaps, and two half-coils of the second coil are kept apart so that the windings are kept out of the stray field. At frequencies higher than the audible frequency range for humans and power levels of several kW as are handled in the apparatus of the invention the magnetic field would dissipate considerable power in all metal parts subjected to the stray field, and it is therefore important to keep the stray field and all metallic components separate. This arrangement ensures that.

In some applications where ozone is used a predetermined yield of ozone is needed or prescribed, or the required yield of ozone may change. In an embodiment each of the flow of oxygen-containing gas and the power supplied from the power supply apparatus to the ozone generating device is controlled so as to obtain a predetermined yield of ozone from the ozone generating device and so as to minimise the consumption of resources comprising oxygen-containing gas and power supplied from the power supply apparatus. The control can be based on a mathematical model of the apparatus and of the process including theoretical and experimental data and may also include actual measurements of relevant parameters for use e.g. in a feedback control system.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A power supply apparatus for supplying electric AC power to a capacitive load having a capacitive load impedance, the apparatus comprising:
   a transformer with a first coil and a second coil, the first coil having first and second half-coils with a common center tap, and
   a positive half-period driver and a negative half-period driver arranged to alternatingly supply positive half-periods of voltage to the first half-coil and negative half-periods of voltage to the second half-coil, respectively, of the first coil,
   the second coil connectable to the capacitive load so as to form an electric resonance circuit having a resonance frequency, and to supply the electric AC power at the resonance frequency to the load, and
   a device for determining zero crossings of the voltage supplied to the first coil and for causing alternation between positive and negative half-periods of voltage supplied to the first coil at zero crossings of the voltage supplied to the first coil, the device for determining zero crossings comprising a separate third coil on the transformer, and each of the positive and negative half-period drivers being arranged to supply the respective half-periods of voltage through an inductive element to the center tap of the first coil, and
   a device for controlling the duration a supply voltage is in electrical communication with the center tap to durations between zero and no more than one quarter of a period corresponding to a predetermined highest resonance frequency of the resonance circuit and thereby control the AC power delivered to the load.

2. An apparatus according to claim 1, wherein the resonance frequency is higher than the audible frequency range for humans.

3. An apparatus according to claim 1, wherein the positive and negative half-period drivers each comprises an electronic switching element.

4. An apparatus according to claim 1, wherein the transformer comprises:
   a core,
   a low voltage coil on the core, and
   a high voltage coil on the core having a plurality of insulating carrier substrates in an overlaying arrangement, each carrier substrate carrying an electrically conductive trace with end portions, the trace forming one or more turns around the core, and a connector pad connecting an end portion of the trace on one substrate to an end portion of a trace on an overlaying substrate.

5. An apparatus according to claim 4, wherein each carrier substrate carries its conductive trace on one substrate surface and the connector pad is on the opposing substrate surface with an electrical connection through the substrate connecting the connector pad to the end portion of the conductive trace.

6. A method of operating a power supply apparatus according to claim 1 having an ozone generating device with a capacitive impedance connected to the secondary coil of the transformer, the method comprising:

supplying a flow of oxygen-containing gas to the ozone generating device, and controlling the flow of oxygen-containing gas and controlling the power supplied from the power supply apparatus to the ozone generating device so as to obtain a predetermined yield of ozone from the ozone generating device and so as to allow minimization of the consumption of resources comprising oxygen-containing gas and power supplied from the power supply apparatus.

* * * * *